Dec. 12, 1933.  W. C. TROUT ET AL  1,939,152

FREE DROP CRANK

Filed Nov. 27, 1928

W. C. Trout
Fred Graham     INVENTORS

BY   Jesse R. Stone
                    ATTORNEY

Patented Dec. 12, 1933

1,939,152

UNITED STATES PATENT OFFICE 1,939,152

FREE DROP CRANK

Walter C. Trout and Fred Graham, Lufkin, Tex.; said Graham assignor to Lufkin Foundry & Machine Company, a corporation Application November 27, 1928
Serial No. 322,279

3 Claims. (Cl. 192—47)

Our invention relates to a crank arm such as that used to reciprocate the walking-beam or other devices in connection with a standard well drilling rig.

It is usual construction to have a power unit such as a steam or internal combustion engine which rotates a shaft and crank arm having a pitman rod connected thereto by means of a wrist pin. This pitman is thus reciprocated and is connected to communicate this motion to a walking beam or other device to cause reciprocation of the standard rig drill bit or other apparatus.

When a string of tools is being operated in the well bore a bit having a weight of a thousand pounds or more is raised on each revolution of the crank arm and then permitted to fall, striking the rock being drilled. In order that an effective blow be struck it is essential that the bit and supporting cable be permitted to fall freely. The crank shaft must necessarily rotate at a uniform rate of speed with the source of power and accordingly often serves as a restraining force upon the cable and tool as they are dropping.

It is an object of our invention to provide a crank shaft and crank arm construction which will permit the free falling of the drill bit.

It is another object to arrange a construction wherein the crank arm is free to rotate in a forward direction ahead of the crank shaft, but is restrained to rotate at a speed not less than that of the crank shaft.

Still another object is to affix on the crank shaft a pawl construction, and to arrange the crank arm rotatably on the crank shaft so that positive rotation is transmitted to the crank arm by way of the pawl construction.

It is also an object to provide a construction wherein a complete reciprocation of the pitman is allowed in less than a complete revolution of the crank shaft.

Another object is to permit the crank arm to idle on the crank shaft when the power unit is being used for other purposes.

Other and further objects will be readily apparent to those skilled in the art to which our invention appertains when the following description is considered in connection with the accompanying drawing wherein.

Figure 1:
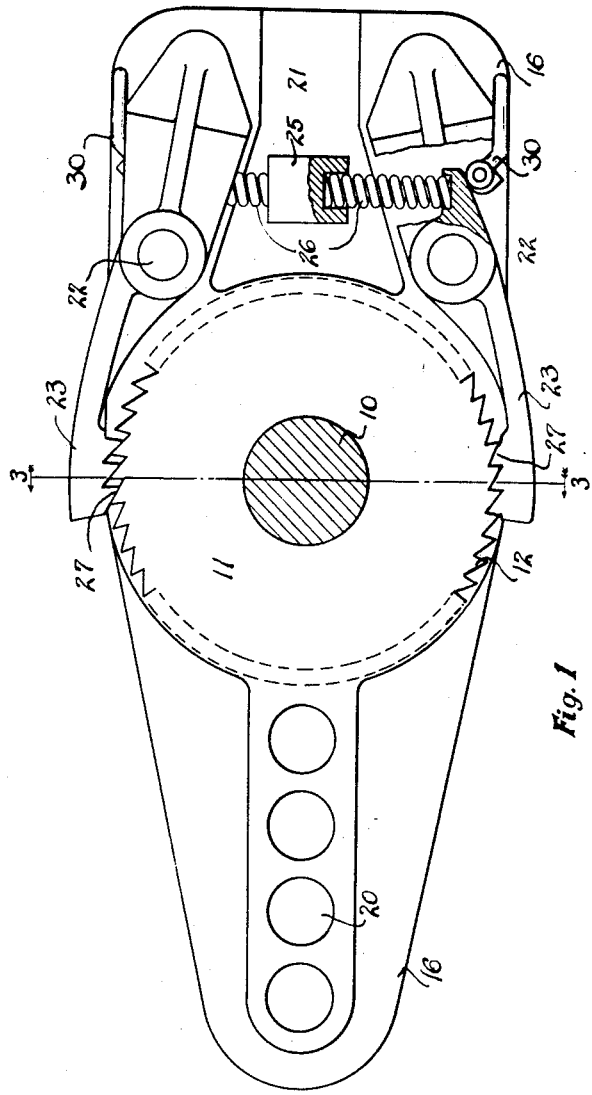
Fig. 1 is a side elevation of our improved free drop crank arm showing it held in a horizontal position by the pawl construction.
Figure 2:
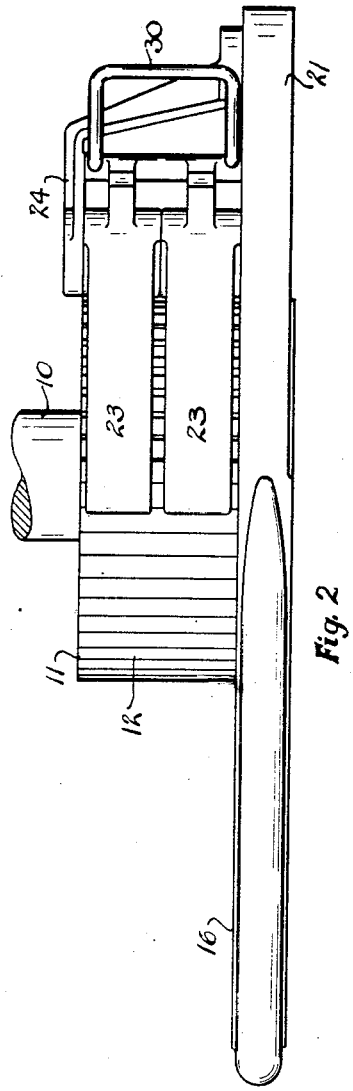
Fig. 2 is a top plan view of the device of Fig. 1, with the crank arm in horizontal position.
Figure 3:
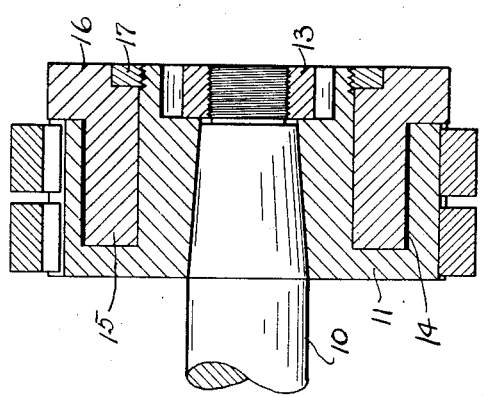
Fig. 3 is a cross section taken on the line 3—3 of Fig. 1 showing how the ratchet disc is retained in position.

A crank shaft, shown at 10, is adapted to be rotated by any suitable power unit at a uniform rate. This shaft is usually tapered somewhat toward its end to receive with a driving fit a crank arm, but in our construction we have provided a ratchet wheel 11 to be used in connection with the usual crank arm. This wheel is arranged with a plurality of teeth 12 on its periphery and is retained firmly upon the crank shaft by means of a nut 13. The outer side of the wheel is cut away to form an annular cavity 14 into which is fitted a sleeve 15 of the crank 16. Suitable bushings or bearings may be provided to permit rotation and allow for lubrication between these members 11 and 15. A retaining ring or nut 17 prevents lateral movement of the crank 16 with respect to the wheel or hub 11.

The crank arm 16 projects beyond the crank shaft on each side, one side having a plurality of openings 20 for attachment of the wrist pin, which carries the pitman or other member to be reciprocated; while on the opposite side, a flange 21 supports two stub shafts 22 which are adapted to receive the sets of pawls 23. A bracket 24 also supports each of the shafts 22 at their upper ends. A central outstanding lug 25 provides a support for springs 26 which retain the pawls in engagement with the teeth 12 of the ratchet hub 11. Each pawl is formed with a plurality of teeth 27 in order that the load may be properly carried. We have shown two pawls in each set but any desired number may be used. It is also preferable to stagger the teeth on one pawl with respect to those of its companion so that a back lash of only a portion of a tooth will be permitted before the pawls assume the load. Pivoted on the flange 21 is a lever or latch 30 adjacent each pawl. Each lever is constructed to exert a pressure on the heel of the pawl 23 whereby it may be retained in raised position out of contact with the ratchet hub 11. With this arrangement the crank shaft may be used to operate the hoist, or in bailing, and the crank arm is free to idle on the hub 11 without disconnecting the pitman and walking beam.

In the usual construction of devices of this type the load is lifted by the crank on its down stroke and very little load or back pull is exerted on the crank by the pitman on the upstroke. With our improved construction, as the crank starts down the load is taken by the pawls 23 engaging the teeth 12 and a rigid pulling connection is formed until the bottom of the stroke is reached and the load is in raised position. As stated, in standard drilling, if the bit falls freely, the full impact is obtained to strike the blow, and with our crank, as soon as the bottom position is reached, the bit begins to drop. If it drops at a rate greater than that of the rotating hub 11 the pawls are free to ratchet over a number of teeth forward but the instant the bit strikes the bottom of the well the acceleration of the crank arm ceases and the pawls engage the teeth next adjacent to them, having gained a small portion of a revolution with respect to the crank shaft and hub 11. It is believed that the advantages of our device will be readily apparent to those skilled in the art, some of such advantages being a freely falling drill bit; constant variation of the point of application of the load on the crank shaft; and freeing of the crank shaft for other purposes without disconnecting the pitman.

It is to be understood that the construction herein disclosed is practical and satisfactory for the purposes in mind but various alterations may be made therein in the further development of the device without departing from the spirit of the invention and we reserve the privilege of resorting to all such legitimate changes as may be fairly embodied within the scope of the invention as claimed.

Having described our invention, what we desire to secure by Letters Patent is:

1. A crank shaft, a ratchet wheel thereon, a crank arm interfitting with said wheel, a flange on said arm projecting from the opposite side of said shaft, pawls pivoted on said flange and adapted to engage opposite sides of said wheel to prevent relative rotation of said wheel and crank arm in one direction but allowing said arm to rotate on said wheel in the opposite direction and cam levers engaging said pawls operable to hold said pawls in inoperative position.

2. A crank shaft, a ratchet wheel thereon, a crank arm interfitting with said wheel at one side thereof and having its arm projecting to one side of said shaft, a flange on said arm projecting from the opposite side of said shaft, pawls pivoted on said flange and adapted to engage opposite sides of said wheel to prevent relative rotation of said wheel and crank arm in one direction but allowing said arm to rotate on said wheel in the opposite direction and means to latch said pawls to allow said shaft and wheel to rotate free of said crank arm.

3. A crank arm construction including a hub adapted for attachment to a horizontal rotating shaft, an annular recess in said hub, a crank arm, a sleeve on said arm fitting in said recess, spring pressed pawls on opposite sides of said crank arm normally engaging projections on said hub to prevent relative rotation of said crank by said shaft in one direction only whereby a reciprocating load may be lifted by said crank and permitted to fall freely.

WALTER C. TROUT.
FRED GRAHAM.